(12) United States Patent
Massey et al.

(10) Patent No.: US 11,945,286 B1
(45) Date of Patent: Apr. 2, 2024

(54) FILTER FOR AN AIR-CONDITIONING SYSTEM OF A VEHICLE AND A METHOD OF INSTALLING SUCH A FILTER

(71) Applicants: Fred Massey, Houston, TX (US); Owen Massey, Round Top, TX (US)

(72) Inventors: Fred Massey, Houston, TX (US); Owen Massey, Round Top, TX (US)

( * ) Notice: Subject to any disclaimer, the term of this patent is extended or adjusted under 35 U.S.C. 154(b) by 0 days.

(21) Appl. No.: 18/322,060

(22) Filed: May 23, 2023

(51) Int. Cl.
- *B01D 46/10* (2006.01)
- *B01D 39/16* (2006.01)
- *B01D 46/88* (2022.01)
- *B60H 3/06* (2006.01)

(52) U.S. Cl.
CPC ....... *B60H 3/0616* (2013.01); *B01D 39/1676* (2013.01); *B01D 46/10* (2013.01); *B01D 46/88* (2022.01); *B60H 3/0658* (2013.01); *B01D 2275/205* (2013.01); *B01D 2275/403* (2013.01); *B01D 2279/50* (2013.01)

(58) Field of Classification Search
CPC .... B01D 46/10; B01D 46/88; B01D 39/1676; B01D 2275/205; B01D 2275/403; B01D 2279/50; B60H 3/0616; B60H 3/0658
USPC ...................................... 55/521, 529, DIG. 5
See application file for complete search history.

(56) References Cited

U.S. PATENT DOCUMENTS

| | | | |
|---|---|---|---|
| 5,192,346 A | 3/1993 | Kowalczyk | |
| 5,492,551 A * | 2/1996 | Wolfe | A62B 23/025 55/DIG. 39 |
| 6,019,676 A | 2/2000 | Kim | |
| 6,164,457 A * | 12/2000 | Schlor | B01D 46/521 210/473 |
| 6,190,569 B1 * | 2/2001 | Parker | B01D 29/118 210/780 |
| 7,083,514 B1 | 8/2006 | Stamey | |
| 7,841,585 B2 * | 11/2010 | Konijn | B01D 3/20 55/452 |
| 8,075,658 B2 | 12/2011 | Volkmer | |
| 8,940,069 B2 | 1/2015 | Haider | |
| 9,687,769 B2 | 6/2017 | Mardall | |
| 9,964,078 B2 | 5/2018 | Pham | |
| 10,328,377 B2 | 6/2019 | Ferreira | |
| 2016/0280046 A1 | 9/2016 | Williams | |
| 2016/0296870 A1 * | 10/2016 | Mckechnie, IV | B01D 46/10 |
| 2017/0001135 A1 | 1/2017 | Paramore | |
| 2017/0368490 A1 | 12/2017 | Wall | |

* cited by examiner

*Primary Examiner* — Minh Chau T Pham
(74) *Attorney, Agent, or Firm* — Egbert, McDaniel & Swartz, PLLC

(57) ABSTRACT

A filter for an air conditioner has a body formed of an air-transmissive material. The body is of a generally rectangular configuration and has a top, bottom, a front, a back and a pair of sides. The body has a plurality of cuts formed through a thickness thereof. The plurality of cuts define a plurality of cubical members frangibly connected together. The plurality of cubical members are separable from a remainder of the body such that the body has a size suitable for being received within a filter-receiving receptacle of the air conditioner.

16 Claims, 2 Drawing Sheets

FILTER FOR AN AIR-CONDITIONING SYSTEM OF A VEHICLE AND A METHOD OF INSTALLING SUCH A FILTER

CROSS-REFERENCE TO RELATED APPLICATIONS

Not applicable.

BACKGROUND OF THE INVENTION

1. Field of the Invention

The present invention relates to filters for air-conditioning systems. More particularly, the present invention relates to filters that reduce or remove dust, pollen, hazardous contaminants and also for the filtration of existing cabin air through filtration by a recirculation mode in order to allow for the removal of internal odors, such as smoke, food and pet odors. More particularly, the present invention relates to such air filters that are installed in cartridge-type receptacles of the air-conditioning system.

2. Description of Related Art Including Information Disclosed Under 37 CFR 1.97 and 37 CFR 1.98

In view of increasing air pollution, in particular in metropolitan areas, in connection with the use of modern air-conditioning devices, it is necessary and desirable to purify the air that is supplied from the exterior to the interior of a motor vehicle. This purification of the air is carried out by suitable air filters. For example, particle filters or odor-eliminating filters or their combinations are suitable for this purpose. The filter should remove or absorb as much as possible of suspended solids, particles and odors contained in the ambient air. Such filters for filtering air for the interior of a motor vehicle are generally known in a plurality of embodiments and variants. [3] An air filter for the cabin of a vehicle typically is a pleated-paper filter that is placed in an outside-air intake for a passenger compartment of the vehicle. Cabin air filters typically are uniquely shaped to fit into an available space within a ventilation system of the vehicle. The cabin air filter can greatly affect the effectiveness of the vehicle's air-conditioning and heating performance. Clogged or dirty cabin air filters can significantly reduce airflow through the vehicle's ventilation system, as well as to allow allergens and contaminants to enter into the vehicle's passenger compartment. A drawback to conventional cabin air filters is that although many believe cabin air filters are generally highly efficient, conventional cabin air filters typically have a relatively low Minimum Efficiency Reporting Value (MERV), and thus allow airborne molecular contaminants and volatile organic compounds (VOCs) to enter vehicle passenger compartments.

FIG. 1 shows a typical cabin air filter 10 of the prior art. This typical cabin air filter is formed of a paper material 12 that is folded into pleats and received within a frame 14. The size of the pleats and the distance between adjacent pleats are configured so as to maximize the filtering ability and airflow characteristics of the air filter 10. The frame 14 will have a particular size to fit the filter-receiving receptacle of the vehicle. Currently, vehicles have a wide variety of sizes of filter-receiving receptacles. It is important that the size of the frame 14, and the included pleated air filter 12, properly fit within the receptacle so as to avoid air leakage therearound. As such, the air filter 10 must be provided in a wide range of sizes.

FIG. 2 shows the air filter 10 as received within a filter receiving receptacle 16 of a vehicle 18. Typically, there is a small door of the forward face 20 of the filter 10 that locks the filter 10 in place within the filter-receiving receptacle 16. At this point in time, the filter 10 is in a proper position for filtering air passing through the air-conditioning system of the vehicle. After a certain amount of time, the door to the air-conditioning receptacle 16 is opened in the direction of arrow 22 and the filter 10 slides outwardly of the filter-receiving receptacle 16 for removal and/or cleaning.

Unfortunately, this configuration of air filter 10 has a large number of drawbacks. For the supplier of such air filters, a wide variety of sizes of such air filters must be maintained in stock. This creates large inventory problems for the supplier. The wide range of different sizes of the filter-receiving receptacle necessitates that many different sizes of air filters remain in stock. Many times, an improperly-sized air filter is provided to the owner of the vehicle. An improperly-sized air filter will either not fit within the receptacle or it will improperly fit within the receptacle so as to allow airflow to pass therearound and remain unfiltered. The ability of such an air filter 10 to filter the air often depends upon the length of time in which the air filter remains within the receptacle. Over time, the pores in the pleated paper material 12 become clogged and air-conditioning filtering efficiency is reduced. Often, it can become so clogged that it ineffectively removes pollutants or reduces operating efficiency. As such, a need has developed so as to provide such an air-conditioning air filter which is adaptable to a wide variety of air-conditioning filter receptacle sizes and shapes.

There are currently other types of replacement filters on the market. However, these require measuring and cutting with tools in order to replicate the existing filter. This technique is very time-consuming. It also has the intrinsic liability of injury.

In the past, various patents and patent application publications have issued with respect to such air-conditioning filters. For example, an early patent is that of U.S. Pat. No. 5,192,346, issued on Mar. 9, 1993 to T. Kowalczyk. This patent teaches an air purifier pleated filter that stops pollution for the passenger inside the motor vehicle. This pleated filter is installed in the plenum of the cowl plenum chamber of the vehicle's heating-cooling system. The filter is equipped with a sensor switch that notifies the driver whenever the filter becomes dirty and must be replaced. The filter includes a hot fluid heater, such as a hot water heater, which protects the filter from freezing and keeps the filter dry which stops bacteria from multiplying and prevents odors.

U.S. Pat. No. 6,019,676, issued on Feb. 1, 2000 to S. Kim, provides an air filtration method and device to more effectively clean the ambient air being fed into a motor vehicle's passenger compartment via the existing OEM ventilation and heating/air conditioning system. The air is treated instantly as it is being discharged into the passenger compartment and the filter is compatible with existing OEM air filtration processes that are provided at the cowl inlet or located mid-stream within the ducting system.

U.S. Pat. No. 7,083,514, published on Aug. 1, 2006 to Stamey, Jr. et al., provides an air-filtration system provided for use in a vehicle for delivering air to a helmet worn by vehicle operator. The air-filtration system comprises an air intake in the form of a window scoop for drawing exterior air, an air duct assembly for delivering air from the air intake to the helmet, and an air filter assembly disposed in-line with the air duct assembly between the air intake and the helmet.

The air filter assembly includes a catalyst member for converting carbon monoxide to carbon dioxide and a particulate filter member.

U.S. Pat. No. 8,075,658, issued on Dec. 13, 2011 to Volkmer et al., provides a filter element that has a zigzag-shaped fold pack of folds. At least one terminal element is folded parallel to the folds of the fold pack. The terminal element has a first leg, a second leg, and a third leg. The first leg is arranged substantially perpendicular to a flow direction of a medium flowing through the filter element. The first, second and third legs are determined by folds in the terminal element. The first and second legs are positioned substantially at right angles relative to one another. The third leg projects laterally away from the filter element to form a peripheral seal.

U.S. Pat. No. 8,940,069, issued on Jan. 27, 2015 to D. Haider, shows an interior air filter for motor vehicle that has a fold pack having a first side. A material with a first leg and a second leg is disposed on the first side. The first leg is attached to the first side and the second leg has a width that is greater than a height of the fold pack. The material strip forms at least partially a head band or a side band of the fold pack. A filter receptacle for the interior air filter has a slanted wall and a mounting and removal opening through which the interior air filter is inserted or removed. The slanted wall extends at an angle that corresponds to an angle defined by the second leg of the material strip of the interior air filter and a contact surface of the filter receptacle.

U.S. Pat. No. 9,687,769, issued on Jun. 27, 2017 to Mardall et al., provides an air filtration system for a passenger compartment of a vehicle that includes a HEPA filter for filtering air from an air inlet into filtered air. The HEPA filter includes a fine particulate filter and a gas filter. Air passageways are formed in the vehicle and configured to convey air from the air inlet to the HEPA filter and to convey the filtered air from the HEPA filter to the passenger compartment.

U.S. Pat. No. 9,964,078, issued on May 8, 2018 to Pham et al., teaches a filter assembly for a motor vehicle air cleaner that includes a main filter, an auxiliary filter set apart from the main filter, and a filter mount fixed to and supporting the main filter and the auxiliary filter. The filter mount is fillable into and removable from the housing of the air cleaner. The filter mount includes a sealing element passing between the main filter and the auxiliary filter.

U.S. Pat. No. 10,328,377, issued on Jun. 25, 2019 to I. Ferreira, shows a filter having a relatively rigid support frame having top and bottom frame members and side frame members. A filter element is disposed within and supported by the frame for filtering a medium passing through the filter element. A pair of opposing members of the frame are bendable into an arch so as to allow the filter to be progressively inserted along an arched path into a filter housing. The filter is a cabin air filter for a vehicle. Opposing sides of the frame are provided with V-shaped notches to facilitate bending the filter into an arch for insertion.

U.S. Patent Application Publication No. 2016/0280046, published on Sep. 29, 2016 to Williams et al., shows a cabin air filter that comprises a supportive frame configured to suitably orient the cabin air filter within an air filtration system of a vehicle. The supportive frame comprises a shape and size suitable for supporting the cabin air filter within the ventilation system. A filter medium is retained within the supportive frame and is configured to remove the airborne molecular contaminants and volatile organic compounds from air flowing through the ventilation system. The filter medium electrostatically attracts and agglomerates contaminants within the air flowing through the air filter.

U.S. Patent Application Publication No. 2017/0001135, published on Jan. 5, 2017 to R. Paramore, describes a cabin air filter that is constructed from a washable and reusable material. This cabin air filter is capable of being positioned within the air-conditioning and heating system of the vehicle and is capable of being washed while substantially maintaining its original shape.

U.S. Patent Application Publication No. 2017/0368490, published on Dec. 28, 2017 to J. J. Wall, teaches a compound air filter provided for sequestering airborne contaminants from air streamed through the air filter. The air filter includes a support frame having a shape and size suitable for setting the air filter within the air filtering system. The compound air filter is retained within the support frame. A first media layer of the compound filter medium is pleated with pleats and configured to exhibit a relatively high filtration efficiency at a low air pressure drop across the filter medium. A second media layer of the filter medium is coupled to the first media layer and configured to maintain a uniform distribution of the pleats within the first media layer.

It is an object of the present invention to provide a filter for an air conditioner that is inexpensive.

It is another object of the present invention to provide a filter for an air conditioner that is easy to install.

It is another object of the present invention to provide a filter for an air conditioner that requires less inventory of the filter assemblies.

It is another object of the present invention to provide a filter for an air conditioner that filters the air very effectively.

It is another object of the present invention to provide a filter for an air conditioner that is adaptable to a wide variety of sizes of filter receptacles.

It is another object of the present invention to provide a filter for an air conditioner that is flame retardant.

It is another object of the present invention to provide a filter for an air conditioner to provide superior filtration.

It is another object of the present invention to provide a filter for an air conditioner that requires no tools for installation.

It is still another object of the present invention to provide a filter for an air conditioner that can be installed within the filter-receiving receptacle very quickly and easily.

These and other objects and advantages of the present invention will become apparent from a reading of the attached specification and appended claims.

BRIEF SUMMARY OF THE INVENTION

The present invention is a filter for an air conditioner. This filter has body of an air-transmissive material. The body is of a generally rectangular configuration. The body has a top, a bottom, a front, a back, and a pair of sides. The body is a plurality of cuts through a thickness thereof. The plurality of cuts define a plurality of cubical members frangibly connected together.

The plurality of cubical members are connected together by a strand or piece of the air-transmissive material. In the preferred embodiment of the present invention, this "air-transmissive" material is an open cell foam material such as foamed polyurethane, foamed polyether, or foamed polyester (reticulated and non-reticulated).

The top of the body is planar and is in parallel planar relationship to the bottom. The pair of sides are also planar and in parallel planar relationship to each other. The front is also planar and in parallel planar relationship to the back.

Each of the plurality of cubical members are separable by hand from a remainder of the body. In the preferred embodiment, each of the plurality of cubical members has sides of approximately one inch square area. In a preferred embodiment of the present invention for vehicle applications, the body would have a length of point of twelve inches and a width of twelve inches. As used herein, the term "vehicles" includes all modes of transportation that incorporate a "cabin air" type of application. These include, but not limited to, heavy equipment vehicles, agricultural machinery, marine vessels, aviation equipment, motor homes, recreational vehicles and all other classes of mobile transportation that incorporate air-conditioning systems. Additionally, the present invention can also be applicable to fixed air-conditioning applications, such as window unit air-conditioning units, mobile air purifiers and other systems that require an air filter. The body in the air-conditioning application of the present invention, such as for window unit air-conditioning systems, would have a length of twenty-four inches and a width of twenty-four inches. The body can have a thickness of one inch. The body has no frame around a periphery thereof. The plurality of cuts are laser cut through an entire thickness of the body. The body is flexible and compressible.

The present invention is also a method of installing a filter in the filter-receiving receptacle of an air conditioner. This method includes the steps of: (1) removing an existing filter from the filter-receiving receptacle; (2) forming a body of air-transmissive material having a plurality of cubical members frangibly connected together; (3) separating some of the plurality of cubical members from a remainder of the body until the body is a size no less than a size of the existing filter; and (4) inserting the body into the filter-receiving receptacle.

In particular, in the method of the present invention, the step of installing comprises compressing the body until the body fits in the filter-receiving receptacle. The step of separating includes breaking some of the cubical members from adjacent cubical members until the body has a size approximating the existing filter. In particular, this can be accomplished by laying the body over the removed existing filter. The cubical members are removed from the body until the body has a length and a width approximating a length and a width of the removed existing filter.

In the preferred embodiment of the method of the present invention, the air-transmissive material is preferably formed of an open cell polyurethane foam material. The body could also be formed of polyether and/or polyester foams (reticulated and non-reticulated). The body has no frame around a periphery thereof. The body has a thickness equal to a thickness of the removed existing filter.

The step of forming the body includes laser cutting slits through the body such that the plurality of cubical members are frangibly connected together. The step of laser cutting is carried out lengthwise and widthwise across the body so as to form the plurality of cubical members. In the preferred embodiment, the cubical members have one inch area sides. The plurality of cubical members can be pulled by the body by hand.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 3:
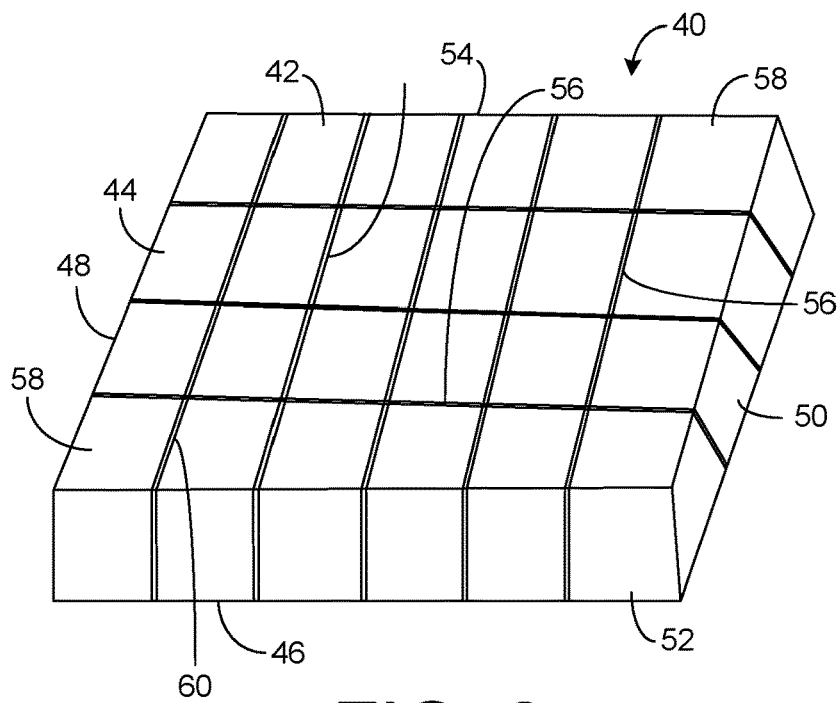
FIG. 3 is a perspective view showing the air filter of the present invention.

Referring to FIG. 3, there is shown the filter 40 in accordance with the preferred embodiment of the present invention. The filter 40 can have a wide variety of shapes and sizes. In particular, the air filter 40 includes a body 42 being formed of an air-transmissive material. In the preferred embodiment of the present invention, this air-transmissive material is an open cell foam material. This open cell foam material can be selected from the group of foamed polyurethane, foamed polyether or foamed polyester (reticulated and non-reticulated). The body has a generally rectangular configuration. In particular, the body has a top 44, a bottom 46, a pair of sides 48 and 50, a front 52, and a back 54. The body has a plurality of cuts 56 through thickness thereof. The thickness is defined between the top 44 and the bottom 46. The plurality of cuts 56 define a plurality of cubical members 58 that are frangibly connected together.

The plurality of cubical members 58 are frangibly connected to each other by a segment or piece of the air-transmissive foam material 60. As such, the body 42 is held together in its generally rectangular configuration by the segments or pieces of the air-transmissive material 60.

The top 44 is in parallel planar relationship to the bottom 46. The pair of sides 48 and 50 are in parallel planar relationship to each other. The front 52 is in parallel planar relationship to the back 54.

Within the air filter 40 of the present invention, each of the plurality of cubical members 58 are separable by hand from a remainder of the body 42. Preferably, each of the plurality of cubical members 58 has sides of one inch square area. For the purposes of fitting the air-conditioning receptacle of the vehicle, these one inch sides of the cubical members will allow a user to easily determine the proper size of the filter 40 to insert within the filter-receiving receptacle of the vehicle. For example, if the size of the OEM filter is seven inches by nine inches, then each of the cubical members 58 can be removed until it achieves the proper size. The body 42, in the preferred embodiment, will have a size of twelve inches by twelve inches for vehicle applications or a size of twenty-four inches by twenty-four inches for window unit air-conditioning systems. As used herein, the term "vehicles" includes all modes of transportation that incorporate a "cabin air" type of application. These include, but not limited to, heavy equipment vehicles, agricultural machinery, marine vessels, aviation equipment, motor homes, recreational vehicles and all other classes of mobile transportation that incorporate air-conditioning systems. Additionally, the present invention can also be applicable to fixed air-conditioning applications, such as window unit air-conditioning units, mobile air purifiers and other systems that require an air filter. As such, the body 42 can be properly shaped by removing the cubical members 58 until the desired size is reached. Since the body 42 has a very large size, many vehicle filters can be formed from a single body 42. In terms of inventory, the use of the relatively large bodies 42 will allow the bodies to be stacked one upon another within a storage area. When a certain size of air filter is required, a person can take the body 42 and remove the cubical members 48 until the desired size is achieved. The remaining portion of the body 42 can be placed back in the storage for future shaping. Since the body 42 has no frame around the periphery thereof, the shaping, by the separation of the cubical members 58 from adjacent cubical members can be carried out in a quick and easy fashion.

The plurality of cuts 56 are achieved by laser cutting through the thickness of the body 42. In particular, there is a series of equally-spaced cuts formed lengthwise across the body and a series of equally-spaced cuts extending widthwise across the body 42. In the course of this laser cutting, a small segment of material 60 is retained so that the cubical members 58 are frangibly secured together. As such, a small force, by hand, allows the cubical members 58 to be separated from a remainder of the body 42.

Figure 4:
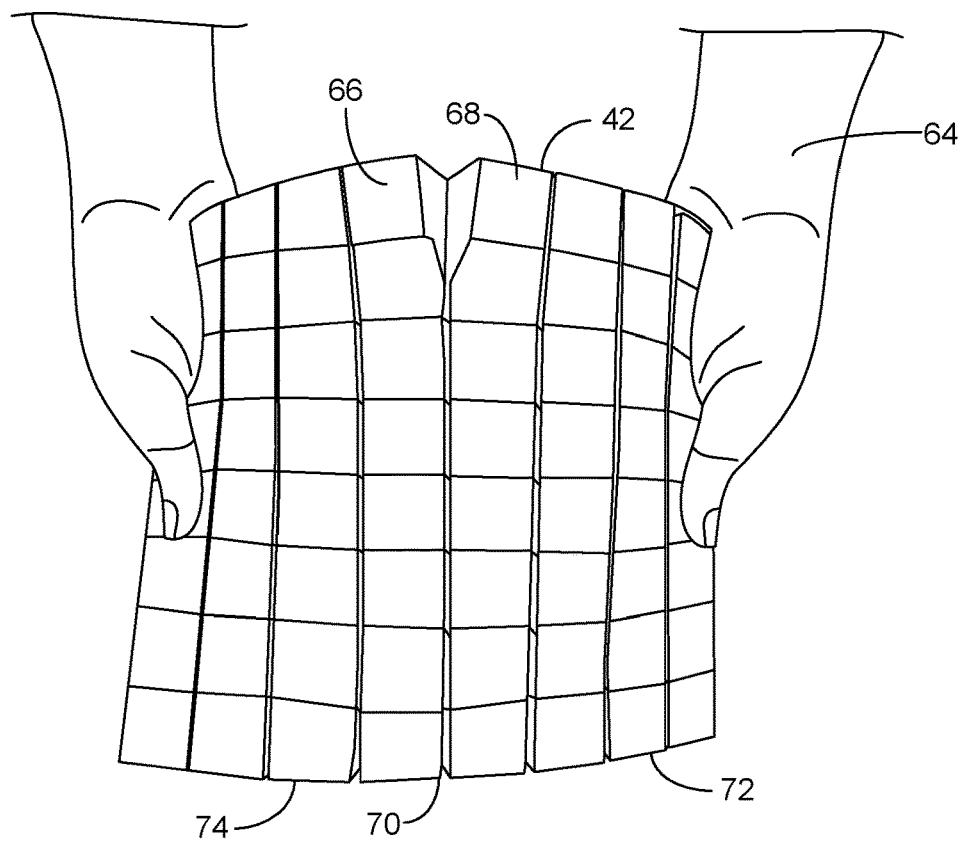
FIG. 4 is a plan view showing the separation of the cubical members of the air filter of the present invention for the purpose of sizing the air filter to the air filter receiving receptacle of the vehicle.

FIG. 4 shows this operation. In particular, in FIG. 4, it can be seen that the body 42 is grasped with the user's hands 64. The user's hands 64 bend the body 42 such that cubical member 66 is separated from cubical member 68. This will continue so that the cubical members along the line 70 continue to be separated from each other and an installable filter 72 is thereby formed. Installable filter 72 has a shape and size adapted to fit the filter-receiving receptacle of the air-conditioning system of the vehicle. The remaining portion 74 can be placed back into storage for future use or discarded. The polymeric foam material used for the manufacture of the body 42 is flexible and compressible. Ultimately, the installable filter 72 should have a size no less than the size of the OEM filter. If it is slightly larger than the OEM filter, then it is easily compressible so as to fit within the filter-receiving receptacle of the vehicle. This compressibility allows the filter of the present invention to be properly retained without the need for a frame and to establish a secure fit within the filter-receiving receptacle.

Experiments with the polyurethane foam material of the body 42 of the filter 40 of the present invention has shown superior particulate retaining capabilities. The particles are removed from the airflow while, at the same time, the airflow through the air-conditioning system is not impeded to any substantial degree. As such, the present invention has a proper Minimum Efficiency Reporting Value (MERV). The configuration of the shaped filter achieved by the present invention prevents airborne molecular contaminants and volatile organic compounds from entering the vehicle passenger compartment. In test conducted with a filter 40 of the present invention, it was found that the MERV value is 11. As reference, the American Society of Heating, Refrigerating and Air-Conditioning Engineers has come up with the MERV value to measure air filter performance. Under MERV, air filters are rated on a scale of 1 to 16 (with 17 to 20 reserved for true HEPA filters). The higher the rating, the more thoroughly an air filter can capture airborne particles as small as 0.3 μm. For example, a MERV value of 1 to 4 will capture most types of dust, pollen and dust mites. A MERV value of 5-8 will capture most mold spores and pet dander. A MERV value of 9-12 will capture car exhaust particles and Legionella bacteria. A MERV value 13 to 16 will capture all bacteria, most smoke, face powder and paint pigments. According to the in U.S. Environmental Protection Agency, filters with a MERV value of 7 to 12 are just as effective as true HEPA filters at removing most airborne particles.

It is important to keep in mind that a higher rating does not automatically mean better performance. As MERV values rise, the pores within the air filter shrink in size. This generates more resistance to air flow. This can cause an HVAC system that is not designed for that particular filter to work harder. Not only can this potentially damage the HVAC system, but it also degrades indoor air quality due to the reduction of airflow through the filter. For this reason, the National Air Filtration Association recommends filters rated at MERV 9 to 12 for residential and vehicular systems. In the present case, the MERV value of 11 is achieved by the polyurethane foam material of the body 42 of the filter 40 and provides an optimum particle retaining capability while reducing strain and resistance on the HVAC system of the vehicle.

Figure 1:
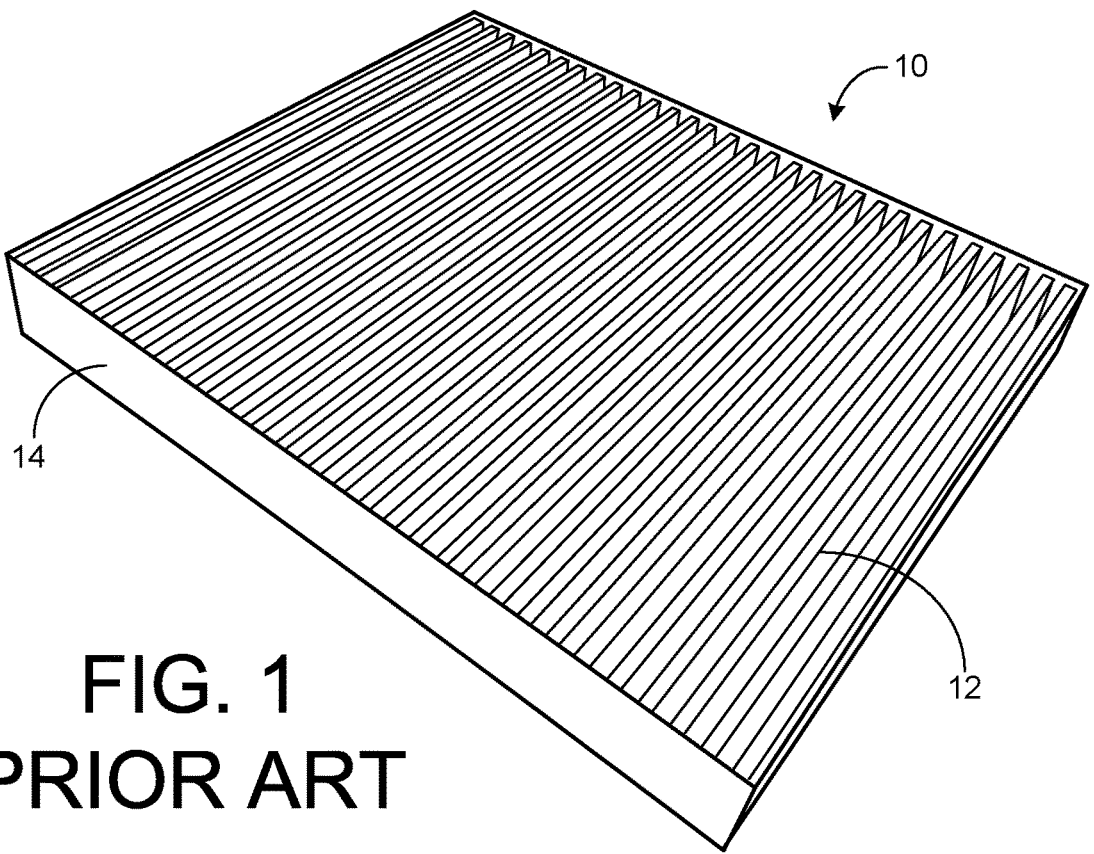
FIG. 1 is an upper perspective view showing a prior art pleated air filter.
Figure 2:
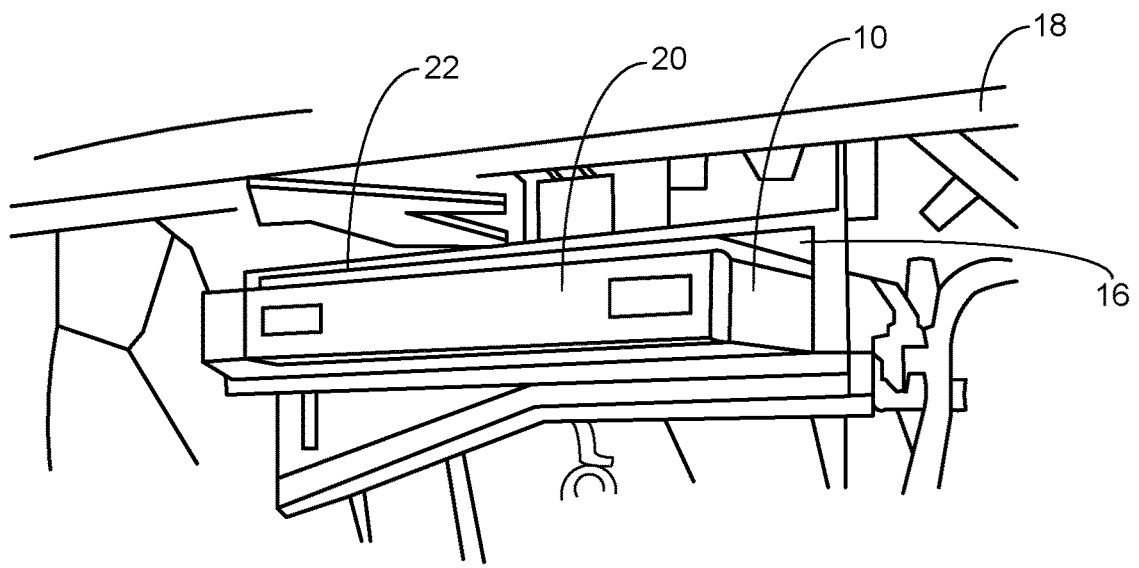
FIG. 2 is a bottom perspective view showing the installation of the prior art pleated air filter into a filter-receiving receptacle of a vehicle.

The filter 40 of the present invention greatly enhances the ability for suppliers to supply such air filters for a wide variety of vehicles. It is not necessary for the supplier to carry a wide variety and large number of sizes of such air filters. Since the present invention lacks the frame associated with existing pleated filters, the storage and shipment can be carried out in a relatively easy and efficient manner by simply compressing the filter and stacking the filters. When a particular size is required, all that is necessary is for the supplier to simply remove those cubical members from the body until the proper size is achieved. The present invention provides ease of installation by virtue of the fact that there are no tools required such as scissors, measuring devices, knives or other cutting devices. Since the filter of the present invention is compressible, minor variations in the size requirements and in the size provided by the supplier will not significantly impede the ability to supply the filter nor impede the ability for the filter to carry out its desired filtering operations. The filter of the present invention has a relatively long life when compared to the pleated paper filters of the prior art (as shown in FIG. 1). The filter of the present invention is relatively inexpensive. Since it is extremely easy to install, the cost associated with installation are significantly reduced.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A filter for an air conditioner of a vehicle, the filter comprising:
    a body formed entirely of an air-transmissive open-cell polymeric material, said body being of a generally rectangular configuration, said body having a top and a bottom and a front and a back and a pair of sides, said body having a plurality of cuts extending entirely through a thickness thereof from the top to the bottom, the plurality of cuts defining a plurality of cubical members frangibly connected together such that each of the plurality of cubical members is separable by hand from a reminder of said body such that an individual cubical member of the plurality of cubical members is removable along both of a portion of a length and a portion of a width of said body.

2. The filter of claim 1, the plurality of cubical members being connected together by a segment of the air-transmissive open-cell polymeric material.

3. The filter of claim 1, the air-transmissive open-cell polymeric material being selected from the group consisting of foamed polyurethane, foamed polyether and foamed polyester.

4. The filter of claim 3, the air-transmissive open-cell polymeric material being open-cell foamed polyurethane.

5. The filter of claim 1, the top being planar and in parallel planar relationship to the bottom, the pair of sides being planar and in parallel planar relation to each other, the front being planar and in parallel planar relation to the back.

6. The filter of claim 1, each of the plurality of cubical members having sides of approximately one inch square area.

7. A filter for an air conditioner of a vehicle, the filter comprising:
   a body formed entirely of an air-transmissive material, said body being of a generally rectangular configuration, said body having a top and a bottom and a front and a back and a pair of sides, said body having a plurality of cuts extending entirely through a thickness thereof from the top to the bottom, the plurality of cuts defining a plurality of cubical members frangibly connected together, said body having no frame around a periphery thereof and no support surface on the top or the bottom thereof, the plurality of cuts extending lengthwise and widthwise across said body such that an individual cubical member of the plurality of cubical members is removable along both of a portion of a length and a portion of a width of said body.

8. The filter of claim 1, said body being flexible and compressible.

9. A method of installing a filter into a filter-receiving receptacle of an air conditioner of a vehicle, the method comprising:
   removing an existing filter from the filter-receiving receptacle;
   forming a body entirely of air-transmissive open-cell polymeric material having a plurality of cubical members frangibly connected together, the step of forming comprising:
   cutting slits entirely through the body such that the plurality of cubical members are frangibly connected together, the cut slits extending lengthwise across the body and widthwise across the body so as to form the plurality of cubical members;
   hand separating some of the plurality of cubical members from a remainder of the body until the body is of a size no less than the size of the existing filter such that an individual cubical member of the plurality of cubical members is separable along both of a portion of a length and a portion of a width of said body; and
   inserting the body with the size no less than the size of the existing filter into the filter-receiving receptacle of the air conditioner of the vehicle.

10. The method of claim 9, the step of installing comprising:
    compressing the body with the size no less than the existing filter until the body fits in the filter-receiving receptacle.

11. The method of claim 9, the step of separating comprising:
    breaking the some of the plurality of cubical members by hand from adjacent cubical members until the body has a size approximating the existing filter.

12. The method of claim 9, further comprising:
    laying the body over the removed existing filter, the step of separating comprising:
    removing some of the plurality of cubical members until the body has a length and a width approximating a length and a width of the removed existing filter.

13. The method of claim 9, the body being formed of a foamed polyurethane material, a foamed polyether material and a foamed polyester material.

14. The method of claim 13, the body being formed of open cell polyurethane material.

15. The method of claim 9, the body having no frame around a periphery thereof.

16. The method of claim 9, the body having a thickness equal to a thickness of the removed existing filter.

* * * * *